UNITED STATES PATENT OFFICE.

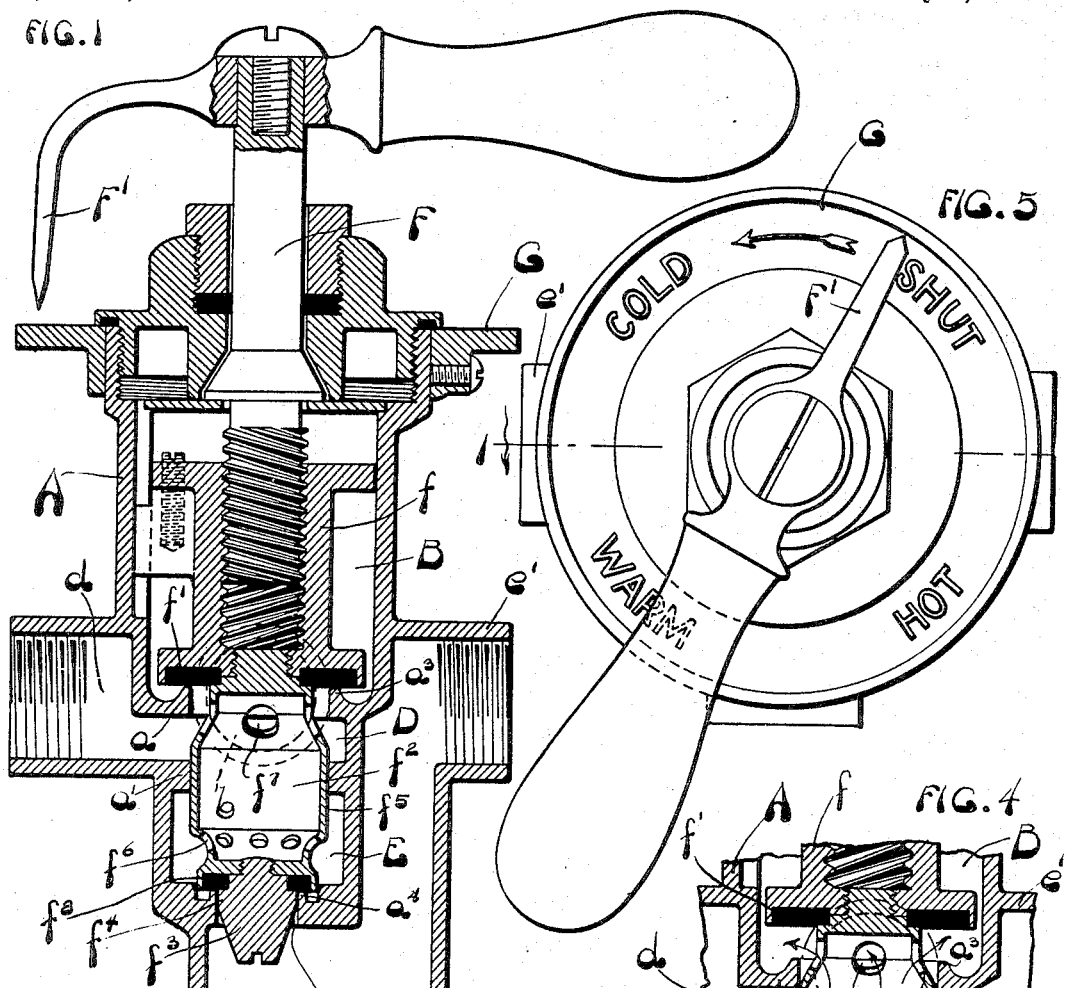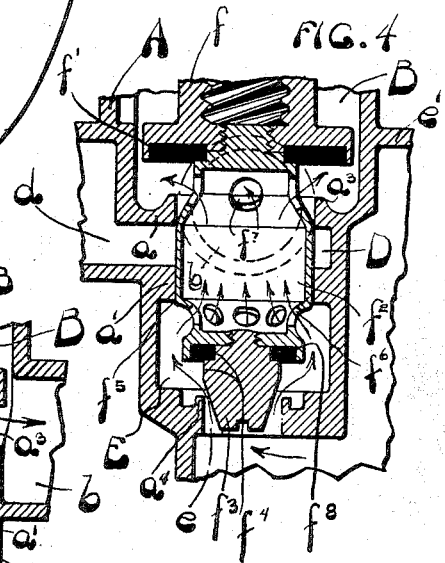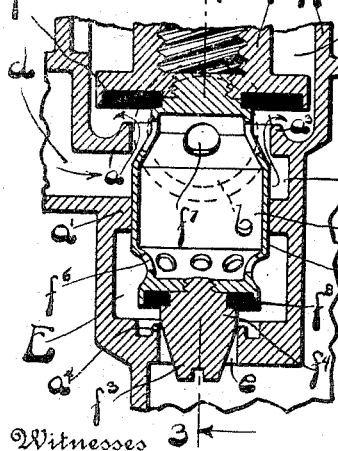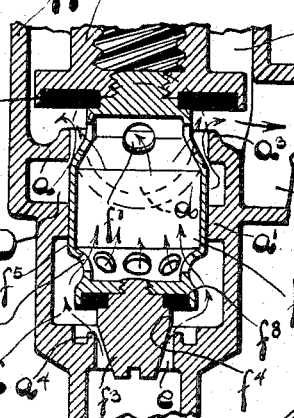

DANIEL W. McNEIL, OF CINCINNATI, OHIO, ASSIGNOR TO THE JOHN DOUGLAS COMPANY, OF CINCINNATI, OHIO, A CORPORATION OF OHIO.

MIXING-VALVE.

1,182,287.   Specification of Letters Patent.   Patented May 9, 1916.

Application filed September 6, 1913. Serial No. 788,380.

*To all whom it may concern:*

Be it known that I, DANIEL W. MCNEIL, a citizen of the United States of America, and resident of Cincinnati, county of Hamilton, and State of Ohio, have invented certain new and useful Improvements in Mixing-Valves, of which the following is a specification.

My invention relates to a valve for regulating a supply of cold, warm and hot water, particularly to valves which are known as anti-scalding valves.

The object of my invention is a valve of simplified construction.

In the accompanying drawings, Figure 1 is a vertical central sectional view of a valve embodying my invention, taken upon line 1—1 of Fig. 5. Fig. 2 is a detail sectional view taken upon the same line as Fig. 1, but showing the valve in position for supplying cold water. Fig. 3 is a sectional view taken upon line 3—3 of Fig. 2, and showing the valve in position for supplying warm water. Fig. 4 is a view similar to Fig. 2, but showing the valve in position for supplying hot water. Fig. 5 is a plan view of the valve.

Housing A is divided by diaphragms $a$, $a'$, into a mixing chamber B, a cold water chamber D, and a hot water chamber E, the aforesaid chambers being located in alinement with each other.

Mixing chamber B has an exit port $b$, cold water chamber D has an admission port $d$, and hot water chamber E has an admission port $e$. The ports $b$ and $d$ are formed upon the sides of the housing A, and the admission port $e$ is formed in the bottom $a^2$ thereof. The ports $d$ and $b$ have surrounding them annular internally screw-threaded extensions of the housing, to be connected to the cold water and the discharge pipes, respectively. The housing has upon its side an L-shaped passage, leading from the admission port $e$ to the screw threaded connection $e'$ of the hot water pipe, this arrangement being made for the purpose of symmetry, in order to place the hot and cold water pipes diametrically opposite each other. Diaphragms $a$, $a'$, have perforations in alinement with the admission port $e$, the perforation in diaphragm $a$ forming a port between the mixing chamber and the cold water chamber, and being surrounded by an annular valve seat $a^3$, and the port $e$ being surrounded with an annular valve seat $a^4$.

The valve stem consists of four parts: an actuating part F, having screw threaded connection with the part $f$, which carries the mixing valve $f'$; the hollow part $f^2$, which contains the passage for connecting the hot water chamber E and the mixing chamber; and the valve $f^3$, for regulating the admission of hot water to the hot water chamber E.

The part $f^3$ of the stem has a cylindrical portion $f^4$, which forms a plug adapted to contact with the walls of the port $e$. This portion $f^4$ is made of a length, such that it takes a quarter turn of the valve stem F to carry the portion $f$ above the port $e$. Thus cold water is admitted to the mixing chamber through the port, between the mixing and cold water chambers, before hot water is admitted to the hot water chamber E.

The portion $f^2$ of the valve stem has cylindrical walls $f^5$, which contact the walls of the perforation in diaphragm $a'$ snugly in all positions of the valve stem. The cylindrical portion $f^5$ is of a length greater than the height of the cold water chamber, so as to extend thereacross and to enter the port $a$, in the uppermost position of the valve. The hollow portion $f^2$ has perforations $f^6$ below the cylindrical walls $f^5$, and perforations $f^7$ above the cylindrical portion. The portion $f^3$ of the valve stem is made of a reduced diameter, so that between it and the portion $f^2$ is formed a shoulder, which constitutes a valve $f^8$, adapted to contact with the valve seat $a^4$. I have made the valve stem in four separate parts, F, $f$, $f^2$, $f^3$, for convenience of manufacture.

I will now describe the operation of my mixing valve.

When the valve is in its closed position, valves $f'$ and $f^8$ contact respectively with valve seats $a^3$ and $a^4$. In this position index finger F' of the actuating handle points to the word "Shut" upon the annular flange G on the valve housing, this valve being secured to the housing by means of a set screw, so that it may be set to bring the word "Shut" in the aforesaid position. A turn of the handle raises the valve stem. First the valve $f'$ is raised from its valve seat, and cold water will then flow through the inlet $d$, upward through the perforation in diaphragm $a$, into the mixing chamber. The portion $f^4$ of the valve stem is still within the port $e$, so that hot water may not enter the valve housing. Cold water will, therefore, be discharged through the discharge pipe $b$. If the handle be moved past the first quarter of its revolution, the portion $f^4$ of the valve stem will be raised past the walls of the inlet $e$, and hot water will then flow into the hot water chamber E, thence through the perforations $f^6$, the hollow portion $f^2$, and the perforations $f^7$, to commingle with the cold water entering the mixing chamber. The greater the amount the valve stem is raised, the greater the amount of hot water admitted to the mixing chamber in proportion to the cold water, so that the degree of warmth of the water may be varied by varying the position of the index finger F′ between the words "Cold" and "Warm" upon the flange G. By giving further rotation to the valve stem, it is carried upward, so that the parts assume the position shown in Fig. 4, wherein the cylindrical portion $f^5$ of the stem enters the port in the diaphragm $a$, thus closing off the mixing chamber from the cold water chamber, and putting it into communication with the hot water chamber E only.

Since cold water is admitted to the mixing chamber before any hot water is admitted to the valve housing, it is seen that there is no danger of a person becoming scalded by having hot water ejected from the valve, when it is first opened, and since the handle must be moved a quarter of a revolution before any hot water is admitted to the mixing chamber, the probabilities of a person scalding himself is rendered still more remote.

What I claim is:

1. A mixing valve consisting of a housing having diaphragms dividing it into three alined chambers, which constitute a mixing chamber, a cold water chamber, and a hot water chamber, the diaphragms being perforated, and the housing being perforated to form an admission port to the hot water chamber, an admission port to the cold water chamber, and an exit from the mixing chamber, a hollow valve stem passing through the perforations in the diaphragms closing the port between the cold and hot water chambers and connecting the hot water chamber with the mixing chamber by its interior passage, a valve upon the valve stem adapted to regulate the opening of the admission port of the hot water chamber, and a second valve upon the valve stem adapted to open the port between the cold water and the mixing chambers in advance of the opening of the hot water port.

2. In a mixing valve, the combination of a housing having two horizontal diaphragms, concentric ports in the diaphragms and the bottom of the housing, the diaphragms dividing the housing into a mixing chamber, a cold water chamber, and a hot water chamber, a hollow valve stem extending through the ports in the diaphragms and the bottom of the housing, the lower part of the valve stem having a cylindrical portion adapted to contact with the walls of the port in the bottom of the housing, while the valve is being raised from the diaphragm between the mixing chamber and the cold water chamber, and the valve stem having a portion of its walls always in contact with the walls of the perforations of the diaphragm between the hot water chamber and the cold water chamber, and adapted to close the opening in the diaphragm between the cold water and the mixing chambers in the uppermost position of the valve, the interior passage of valve stem connecting the hot water chamber with the mixing chamber, and the valve upon the valve stem adapted to seat upon the diaphragm between the mixing chamber and the cold water chamber.

3. A mixing valve having a housing with diaphragms dividing it into a mixing chamber, a cold water chamber, and a hot water chamber, the diaphragms having perforations putting the mixing chamber into communication with the cold water chamber, and the cold water chamber into communication with the hot water chamber, the housing having admission ports to the mixing chamber, the cold water chamber, and the hot water chamber, a valve stem extending through the ports in the diaphragms and having an enlarged portion adapted to keep the port between the cold water chamber and the hot water chamber closed, and in its uppermost position to close the port between the mixing chamber and the cold water chamber, and having an internal passage adapted to place the hot water chamber into communication with the mixing chamber and to direct the hot water transversely of the flow of cold water into the mixing chamber, whereby the hot and cold water will be mixed.

4. In a mixing valve, the combination of a housing, having a mixing chamber, a cold water chamber, and a hot water chamber formed therein, a ported diaphragm formed in said housing between said mixing and cold water chambers and having a valve seat formed thereon, a ported diaphragm formed in said housing between said cold and hot water chambers, a ported diaphragm formed in said hot water chamber and having a valve seat formed thereon, a valve stem located in said housing and extending through the ports in said diaphragms, a valve located on said valve stem, adapted to contact said first mentioned valve seat to close the port between said cold water and said mixing chambers, a second valve located on said valve stem, adapted to contact said second mentioned valve seat to close the port in the diaphragm located in the hot water chamber, a hollow cylindrical portion having ports formed near the top and bottom thereof, located on said valve stem between said valves and slidingly contacting the walls of the port in the second mentioned diaphragm, and a plug located at the end of said valve stem adapted to close the port in the last mentioned diaphragm when said valves are closed.

In testimony whereof, I have hereunto subscribed my name this 3rd day of September, 1913.

DANIEL W. McNEIL.

Witnesses:
W. THORNTON BOGERT,
B. R. KROPF.